United States Patent [19]

Tomlinson et al.

[11] Patent Number: 5,080,086
[45] Date of Patent: Jan. 14, 1992

[54] WIRE SAW WITH DIAMOND CUTTING EDGE

[76] Inventors: Peter N. Tomlinson, 315 Enford Rd., Mondeor, Johannesburg, Transvaal; Bruce S. Hill, 4 Swartgoud Street, Winchester Hills, Johannesburg, Transvaal; Aulette Stewart, 45 Arend Avenue, Randburg, Transvaal, all of South Africa

[21] Appl. No.: 428,845

[22] Filed: Oct. 30, 1989

[30] Foreign Application Priority Data

Oct. 28, 1988 [ZA] South Africa ............. 88/8112

[51] Int. Cl.5 .................................. B28D 1/08
[52] U.S. Cl. ........................... 125/21; 125/22
[58] Field of Search ............. 51/307, 309; 125/21, 125/22

[56] References Cited

U.S. PATENT DOCUMENTS

| 3,598,101 | 8/1971 | Hensley | 125/21 |
|---|---|---|---|
| 4,097,246 | 6/1978 | Olson | 125/21 |
| 4,224,380 | 9/1980 | Bovenkerk et al. | 51/309 |
| 4,674,474 | 6/1987 | Baril | 125/21 |

Primary Examiner—M. Rachuba
Attorney, Agent, or Firm—Scully, Scott, Murphy & Presser

[57] ABSTRACT

A wire saw comprises a wire rope to which a plurality of cutting elements are secured in spaced relationship along its length. The cutting elements comprise a cylindrical metal sleeve, the central portion of which is swaged so that the inner surface grips the rope securely. Brazed to each end of the sleeve is a ring of a thermally stable diamond compact. The edges of the rings provide cutting edges for the element.

5 Claims, 1 Drawing Sheet

WIRE SAW WITH DIAMOND CUTTING EDGE

BACKGROUND OF THE INVENTION

This invention relates to a wire saw with a diamond cutting element.

Wire saws for cutting stone or other hard material are known in which a cylindrical cutting element is fixed to a wire rope or cable. The wire rope is pulled across the surface of the material to be sawn, so that the cutting elements abrade the surface along the line of the rope.

It is known for cutting elements to consist of a mass of diamond particles held in a metal matrix. Such elements have the advantage that they can relatively easily be formed into suitably shaped cutting elements. Although these cutting elements are generally satisfactory, there is a tendency for cutting elements to be polished by the cutting action, so that their effectiveness is gradually reduced.

Examples of wire saws with diamond cutting elements are described in European Patent Publication No. 0,213,434 and U.S. Pat. No. 4,097,246.

SUMMARY OF THE INVENTION

According to the invention, a cutting element for a wire saw comprises a support element having an inner surface adapted to be secured to a wire rope and an outer surface to which is secured a thermally stable diamond compact which presents a cutting edge or surface.

Further according to the invention, a wire saw comprises a wire rope to which a plurality of the cutting elements described above are secured in spaced relationship along its length.

DESCRIPTION OF EMBODIMENTS OF THE INVENTION

Figure 1:
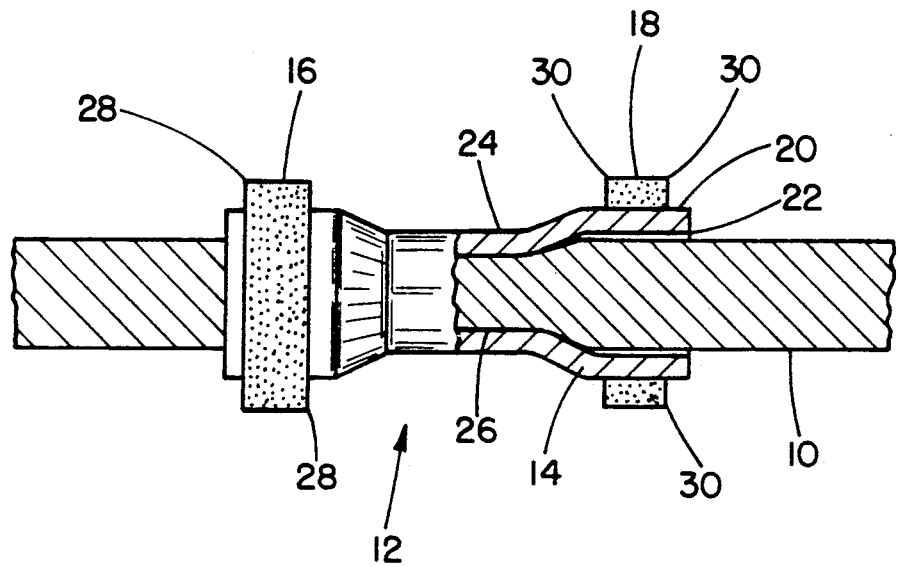
FIG. 1 is a partial sectional view of a portion of the wire saw according to the invention.

The cutting element of the invention has, as its essential feature, a thermally stable diamond compact which provides the cutting edge or surface for the element. It has been found that thermally stable diamond compacts tend to be friable resulting in small fragments breaking off during cutting. This breaking off of fragments exposes fresh, sharp edges which give effective cutting action. Thus, the polishing effect which occurs with prior art cutting elements is minimised.

Thermally stable diamond compacts are known in the art and are diamond compacts which do not significantly graphitise when subjected to temperatures of the order of 1200° C. in a vacuum or a reducing or inert atmosphere. An example of a thermally stable diamond compact can be found described in U.S. Pat. No. 4,224,380.

Examples of other thermally stable diamond compacts are those which consist of a bonded polycrystalline diamond mass having a second phase which is essentially non-metallic in nature uniformly dispersed therethrough. These second phases may comprise a refractory carbide-forming element such as silicon, alone or in combination with a metal, e.g. of the type described in British Patent No. 2,158,086 or U.S. Pat. No. 4,534,773. The preferred thermally stable diamond compact is that described in the above-mentioned British patent which comprises a mass of diamond particles present in an amount of 80 to 90% by volume of the mass, and a second phase present in an amount of 10 to 20% by volume of the mass, the diamond particles containing substantial diamond-to-diamond bonding to form a coherent, skeletal mass, and the second phase containing silicon in the form of silicon and/or silicon carbide.

The thermally stable diamond compact may consist of a single, undivided body. Alternatively, the compact may comprise a plurality of fragments bonded to each other. Bonding between adjacent fragments will typically be achieved by means of a suitable braze.

The support element preferably is a sleeve. The sleeve may be metallic in nature in which case it will preferably be swaged to the wire rope.

The thermally stable diamond compact, when the support element is metallic in nature, is preferably brazed to the outer surface of that element. Brazing may be achieved by means of a high temperature braze because of the thermal stability of the compact. Preferably, the surface of the compact which is brazed to the outer surface of the support element is provided with a molybdenum, titanium, tantalum, tungsten, chromium, or like high melting metal coating. Such a coating improves the brazeability of the compact to the metallic support element.

When the support element is a sleeve, the thermally stable diamond compact will preferably also be a sleeve or ring secured to the support sleeve. Preferably, a sleeve or ring of thermally stable diamond compact is provided on each end of the sleeve.

The wire rope (or cable as it is also sometimes called) will be of standard and known configuration and will generally be made of a suitable metal.

FIG. 1 of the drawings illustrates a short section of wire rope 10 to which is secured a cutting element 12. The cutting element comprises a cylindrical metal sleeve 14 with rings 16, 18 of a thermally stable diamond compact brazed to the outer surface 20 of the sleeve 14 at each end thereof. The inner diameter 22 of the sleeve 14 is originally slightly greater than the diameter of the wire rope 10, to allow the sleeve to be fitted to the rope when the wire saw is assembled. The central portion 24 of the sleeve 14 is then swaged so that its cross-section is reduced and the inner surface 26 grips the rope 10 securely.

Figure 2:
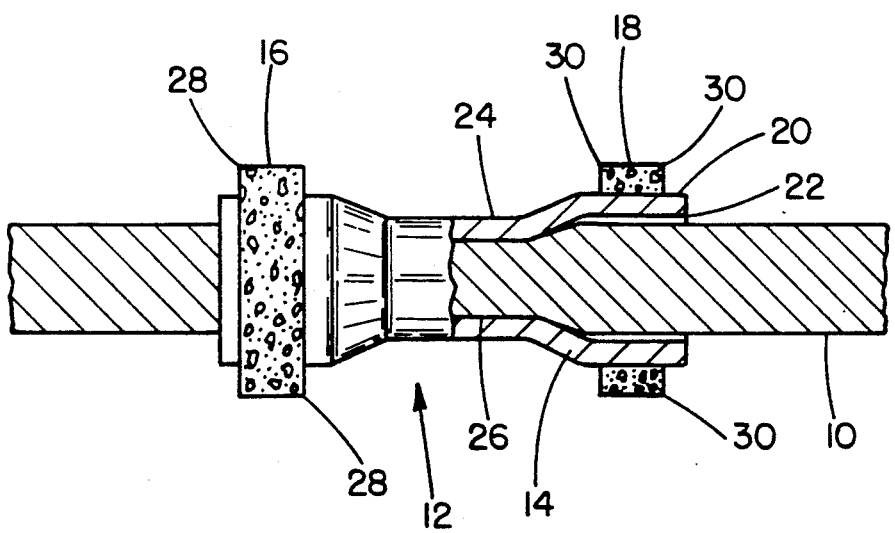
FIG. 2 is similar to FIG. 1, but showing the fragments in the compact abrasive.

FIG. 2 is similar to FIG. 1, however illustrates the fragments in the abrasive rings 16 and 18.

When the wire saw is used, the rope 10 is pulled across the surface of the material to be cut, which may be, for example, stone, marble, granite or quartsite. The edges 28, 30 of the compact rings 16 and 18, respectively, of the cutting element scrape against the material, and abrade it. Due to the physical characteristics of the compact, which cause it to break down in a friable manner as it wears, the edges 28 and 30 of the compact rings tend not to be worn smooth as sawing proceeds, but remain rough as small particles of the compacts are broken away. This results in the cutting element retaining its effectiveness for a longer time than conventional cutting elements.

It will be appreciated that the illustrated cutting element is purely exemplary, and that various other embodiments of cutting elements incorporating thermally stable diamond compacts are possible.

We claim:

1. A cutting element for a wire saw which comprises a metal support sleeve having an inner surface adapted to be secured to a wire rope and an outer surface to which is brazed at each end thereof, a thermally stable diamond compact which presents cutting edges which are raised from the surface of the support sleeve.

2. A cutting element according to claim 1 wherein the thermally stable diamond compact is composed of plurality of fragments bonded to each other.

3. A cutting element according to claim 1 wherein the thermally stable diamond compact consists of a single, undivided body.

4. A wire saw comprises a wire rope to which a plurality of cutting elements according to claim 1 are secured in spaced relationship along the length thereof.

5. A wire saw according to claim 4 wherein the metal support sleeve of each cutting element is a sleeve which is swaged to the rope.

* * * * *

UNITED STATES PATENT AND TRADEMARK OFFICE
CERTIFICATE OF CORRECTION

PATENT NO. : 5,080,086

DATED : January 14, 1992

INVENTOR(S) : Peter Noel Tomlinson, et al.

It is certified that error appears in the above-identified patent and that said Letters Patent is hereby corrected as shown below:

Column 4, line 8, Claim 5: "a sleeve" should read as --a metallic sleeve--

Signed and Sealed this

Fourth Day of May, 1993

Attest:

MICHAEL K. KIRK

*Attesting Officer*     Acting Commissioner of Patents and Trademarks